United States Patent Office 3,233,416
Patented Feb. 8, 1966

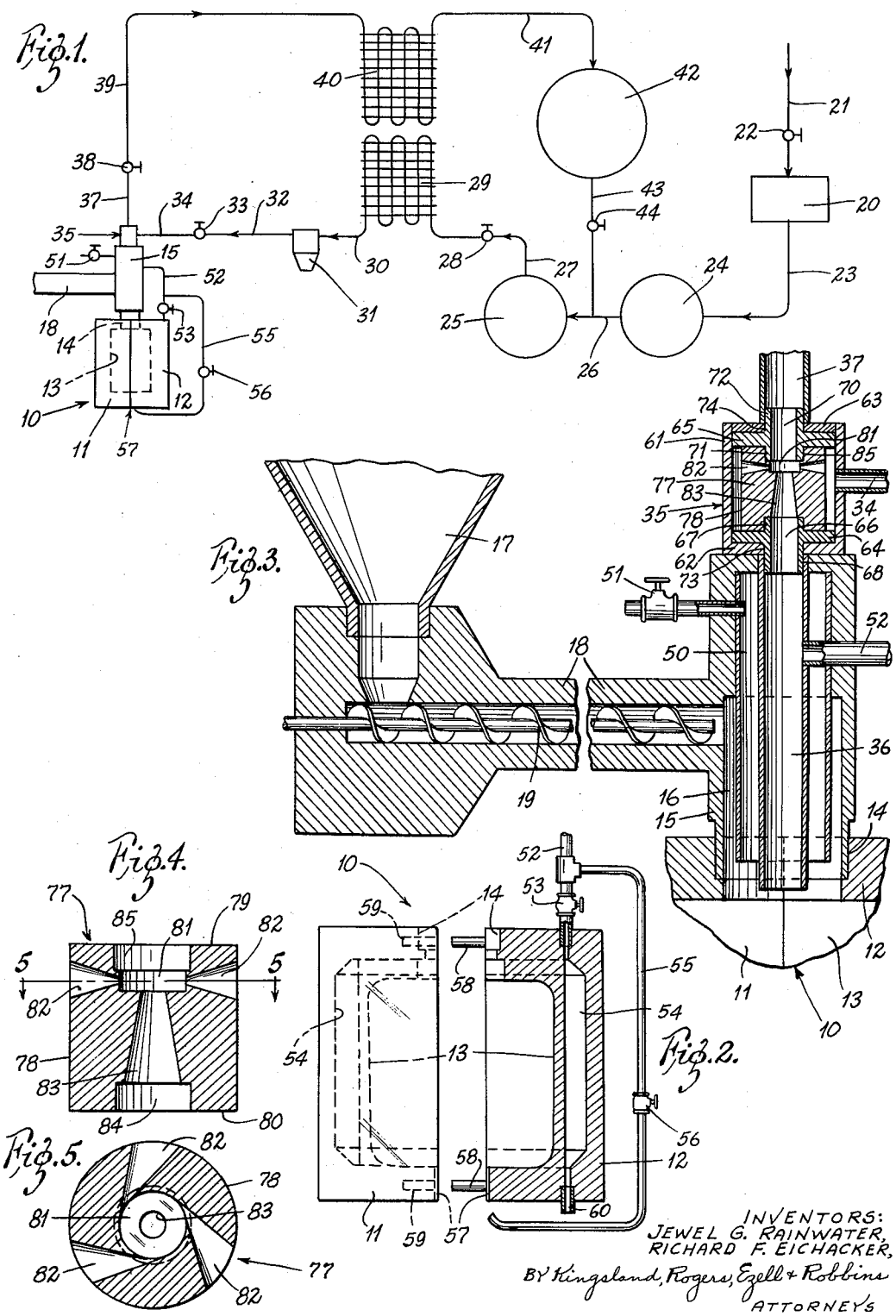

3,233,416
BLOW MOLDING SYSTEM WITH VORTEX TUBE
Jewel G. Rainwater, 762B W. Canterbury Road, St. Louis, Mo., and Richard F. Eichacker, 615 W. Parkview, Arthur, Ill.
Filed Feb. 10, 1964, Ser. No. 343,641
5 Claims. (Cl. 62—5)

This invention relates to blow molding plastic or glass and particularly to a system for cooling the blown object in the mold cavity.

The invention generally involves the use of a vortex tube in the line that carries the blowing air. The vortex tube is characterized by its ability to separate supply air into a hot air discharge and a cold air discharge. The cold air discharge or fraction of air is delivered to the to the mold cavity in the same way as blowing air is delivered in a conventional blow molding system. Because of the vortex tube, the blowing air is cold and cools the blown object rapidly following its expansion against the cavity walls.

In conventional blow molding systems, the blowing air is at room or higher temperature. The cooling is done by circulating cold water through the mold body. This conventional cooling method has the serious disadvantage of causing condensation on the wall of the mold cavity so that sometimes as many as half of the objects blown have surface defects caused by the condensation and must be discarded or accepted as inferior quality objects. In the present system, since cooling is done on the inner side of the blown object by the blowing air, this condensation does not occur.

The principal object of this invention is to provide a blow molding device with a system for carrying the blowing air through a vortex tube to cool the blowing air and produce resultant cooling of the blown object.

A particular object of the invention is to provide a system for cooling an object in a blow mold cavity from inside the object rather than through the cavity wall, thereby eliminating condensation that frequently occurs on the cavity wall and ruins the object.

Normally the use of cold blowing air will be sufficient to cool the blown object. In some cases, however, it is also desirable to cool the mold body itself, and for this purpose the mold body has an air jacket distributed through the wall surrounding the cavity. A branch air line is connected from the cold air outlet of the vortex tube to this air jacket. A valve determines the admission of air through this branch line. Even when cold air is circulated through the mold body, the temperature of the mold body need not be and is not brought as low as in the common water circulation cooling systems that do not have the aid of the cooled blowing air. In other words, since there is vortex cooling of the blowing air, the mold body can be kept at a temperature above that which would cause condensation.

Another object of the invention is to provide a blow molding system including a vortex tube for cooling the blowing air and for cooling air that is selectively supplied to a jacket surrounding the mold cavity.

Still another use of the cold blowing air is to cool the flash that occurs during the blow molding process. Another air line carries cold air from the vortex tube to the flash area. This line is controlled by a valve and admits cooling air to cool the flash rapidly. Rapid cooling of the flash permits earlier removal of the blown object from the mold.

Accordingly, another object of the invention is to provide a blow molding system with means for conveying cold air from the outlet of a vortex tube to a discharge area against a place or places where flash occurs during the molding process.

This system also makes use of the warm air fraction supplied by the vortex tube. Pipes carry this warm air to the hopper to heat and dry the plastic in the hopper, to the extruder for heating plastic in the extruder, and to the extruder head for heating plastic there. All of these pipes are individually controlled by valves.

Another object of the invention is to provide a blow molding system including a vortex tube for supplying cold blowing air, and for supplying hot air, with means for conveying the hot air to the various plastic handling parts of the system for heating plastic within these parts.

Another object of the invention is to provide a blow molding system that has a vortex tube for supplying cold blowing air, with means to capture the blowing air exhausted from the mold cavity and to use this captured air as an insulator surrounding the pipe carrying the blowing air.

Other objects and advantages will be apparent to those skilled in the art.

In the drawing:
FIGURE 1 is a schematic flow diagram of a blow molding system incorporating this invention;
FIGURE 2 is a side elevation view of two mold halves, one of which is shown in vertical section;
FIGURE 3 is a fragmentary view in vertical section of the vortex tube and manifold leading to and from the extruder;
FIGURE 4 is a view in vertical section through the axis of the vortex tube insert; and
FIGURE 5 is a view in section taken along the line 5—5 of FIGURE 3.

Referring now to the drawing, the general nature of this system is schematically illustrated in FIGURE 1, whereas a specific structural embodiment having certain advantages to be explained is illustrated in FIGURES 2–5. In the system of FIGURE 1 there is a mold 10 having two halves 11 and 12 that close to form a mold cavity 13 and that can be separated for removal of the object that has been molded. There is an opening 14 through the top of the mold 10 for the introduction of glass, plastic, or other plasticized material and blowing air.

An extruder head 15 is positioned adjacent the opening 14 in the mold 10. The extruder head has a passage 16 in communication with the opening 14. A hopper 17 (FIGURE 3) for mixing glass or plastic particles and preparing it for extrusion makes the usual connection to an extruder 18 having a screw 19 or other conventional device which forces glass or plastic through the passage 16.

The mold 10, the extruder head 15, the hopper 17, and the extruder 18, as well as the way they are connected together, are conventional. Also their operation is conventional. Each of these components may be varied as desired. Any of the well known extruders 18 may be used. Any mold 10 having any shape or size of cavity and any orientation of plastic injection inlet, may be used.

In conventional blow molding devices, a source of compressed air is connected to the passage 16 in the extruder 15. At the proper time a valve is opened and the compressed air is conveyed to the passage 14 leading to the mold cavity 13 to expand the glass or plastic parison within the cavity to form the object. Conventionally, these molds are cooled by circulating water through the outer body of the mold 10 surrounding the cavity 13. This method of cooling is slow and often results in condensation on the inner wall of the cavity 13. Whenever this condensation occurs, small pockets are formed in the surface of the object being molded and the object is defective. A large percentage of the objects formed by blow molding must be discarded because of faults produced by condensation on the wall of the mold cavity.

In the cooling system of this invention, there is a dryer 20 having an air inlet 21 controlled by a valve 22. A pipe 23 connects the dryer to an air compressor 24, and there may be a second compressor 25 connected by a pipe 26 to the compressor 24 to provide two stage compression. An outlet pipe 27 from the compressor 25 is connected to a valve 28 on the inlet side of a heat exchanger 29. The purpose of the heat exchanger 29 is to cool air leaving the compressor 25. The outlet 30 from the heat exchanger 29 is connected through a filter and trap 31 to another pipe 32. The pipe 32 in turn is connected to a valve 33 in the inlet pipe 34 to a vortex tube 35.

A cold air outlet pipe 36 from the vortex tube extends through the extruder 15 and into the inlet opening 14 in the mold cavity 13. As shown, the extruder passage 16 surrounds the cold air pipe 36 so that when a glass or plastic parison is injected into the mold cavity, the cold air is directed by the pipe 36 into the inside of the parison. The warm air outlet pipe 37 from the vortex tube is connected through a control valve 38 to another pipe 39. The pipe 39 leads to a heat exchanger 40 for cooling the warm air. The outlet pipe 41 from the heat exchanger 40 is connected to an air storage tank 42. The air storage tank 42 has an outlet pipe 43 connected through a pressure regulating valve 44 to the inlet pipe 26 leading to the second compressor 25.

It is apparent that the temperature, pressure, and humidity conditions of the inlet air to the vortex tube can be controlled as desired by the dryer 20, the compressors 24 and 25, and the heat exchangers 29 and 40. The air should be as dry as possible. Various temperature and pressure ranges are possible, but an inlet temperature of 80° F. and pressure of 200 p.s.i.a. have been found suitable.

The valve 38 on the hot air outlet side of the vortex tube controls the temperature of both the hot and cold outlets 37 and 36. Thus, throttling of the valve 38 reduces the hot air outlet temperature and raises the cold air outlet temperature. Normally the cold air should be at about 20° F.

The cold air from the outlet pipe 36 is used as the blowing air during the blow molding process. At the same time, the cold air constitutes the cooling medium for the plastic or glass. To do its job as both cooling and blowing air, the air must be injected into the parison at a sufficiently high pressure to expand the plastic or glass parison against the side wall of the mold. Therefore, an exhaust chamber 50 extends from the extruder passage 16 and is disposed coaxially about the cold air outlet pipe 36. The chamber 50 is closed except for an outlet valve 51 that is opened to exhaust air from the chamber to atmosphere. The exhaust valve 51 is throttled so that air cannot be exhausted faster than it enters the mold cavity, and a desired blowing pressure is maintained. The cross sectional area of the chamber 50, however, is larger than the cross sectional area of the pipe 36.

There is also a branch pipe 52 connected from the cold air outlet pipe 36 through a control valve 53 to an air jacket 54 within the wall of the mold 10. The jacket 54 circulates cold air through the mold to assist in the cooling process. Another pipe 55 is controlled by a valve 56 to deliver cold air to a point opposite a flash relief opening 57 in the mold 10 to provide rapid cooling of the flash that occurs at the flash relief opening 57.

FIGURE 2 shows this jacket and flash cooling as applied to a specific mold 10 having two mold halves 11 and 12 and a mold cavity 13 shaped to form a bottle. It has guide pins 58 and recesses 59 for accurately positioning the two mold halves 11 and 12. The parison and blowing inlet passage 14 is at the top of this mold and can be connected in the conventional way to the extruder head.

The branch pipe 52 is connected to a jacket 54 within the wall of the mold. The jacket 54 has extensions (not shown) that circulate cold air through various parts of the mold body to assure uniform cooling. There is an exhaust air outlet 60 for the discharge of air after it has circulated through the mold body. The pipe 55 has its outlet end directed toward the area 56 of the mold where flash occurs (at the bottom of this particular mold 10.)

FIGURES 3, 4 and 5 illustrate a particular construction of the vortex tube. In this construction, the vortex tube housing comprises a cylindrical outer wall 61 that may have one end 62 permanently affixed to it, and the other end 63 made removable. The fit between the end 63 and the cylindrical wall 61 is airtight.

There is an insert plate 64 positioned against the wall 62, and an insert plate 65 positioned against the wall 63. The insert plate 64 has an outlet passage 66 through it with inwardly and outwardly extending sleeves 67 and 68. The insert plate 65 has an outlet port 70 through the wall 65 defined by an inner sleeve 71 and an outer sleeve 72. The sleeve 68 passes through a hole 73 in the end wall 61, and the sleeve 72 passes through a hole 74 in the end wall 62. The outlet pipe 36 is fastened to the sleeve 68 by conventional airtight means, and the outlet tube 37 is fastened to the sleeve 72 by conventional airtight means.

An insert 77, illustrated in FIGURES 4 and 5, fits within the cylinder 61 between the ends 64 and 65. The insert 77 has a cylindrical side wall 78, a top wall 79, and a bottom wall 80. There is a cylindrical chamber 81 within the insert body. Three inlet passages 82 open tangentially into the chamber 81, as illustrated in FIGURE 5. As illustrated, these inlet passages 82 converge toward the chamber 81.

A diverging passage 83 extends from the chamber 81 toward the end 80 of the insert 77. There is a countersunk recess 84 in the end wall 80 coaxial with the passage 83. There is another countersunk recess 85 coaxial with the chamber 81. When the insert 77 is fitted within the cylinder 60, the sleeve 67 fits tightly within the recess 84, and the sleeve 71 fits tightly within the recess 85. Both of these fits are airtight.

*Operation*

Ordinarily, there is no need for the circulation of cooling air through the jacket 54 in the body of the mold 10, and the valve 53 is closed. The valve 56 is normally open to admit cooling air to the flash area 57.

Supply air comes to the vortex tube 35 from the drier 20, the compressors 24 and 25, and the heat exchanger 29, through which this supply air passes in series. The supply air is dry, its pressure is about 200 p.s.i.a., and its temperature is about 80° F. The valve 22 controls the amount of new supply air brought into the system. Some of the supply air comes from the storage tank 42.

The supply air enters the vortex tube through the inlet pipe 34. The vortex tube separates the supply air into hot and cold fractions, the hot fraction of air being discharged through the pipe 37 at a temperature of about 180° F., and the cold fraction of air being discharged through the pipe 36 at a temperature of about 20° F. This cold air is used to blow the parison against the wall of the mold cavity 13 in the same way as any blowing air in any blow molding system. Since this blowing air is cold, it cools the glass or plastic as it continues to flow into the mold cavity and pass along the inner wall of the blown object.

The air escapes from the mold cavity into the outer jacket 50 that surrounds the pipe 36. Although this escaping air will have been heated considerably by the molded object, it will still be at a substantially lower temperature than atmospheric temperature so that its presence in the area surrounding the pipe 36 acts somewhat as an insulator against heading of the cold air in the pipe 36 by the surrounding atmosphere. It also acts to insulate the extruder passage 16 from the cold air pipe 36. The enlarged diameter of the jacket 50 reduces the speed of the exhausted air and adds to this insulating effect.

When the valve 53 is opened, cooling air is admitted to the air jacket 54 to cool the mold body. Since the blowing air is cold, the mold body need not be cooled to as low a temperature as in conventional blow molding devices. Thus, the temperature of the mold body is kept above the dew point of the air within the mold cavity to prevent condensation on the cavity walls.

Various changes and modifications may be made within the purview of this invention as will be readily apparent to those skilled in the art. Such changes and modifications are within the scope and teaching of this invention as defined by the claims appended thereto.

What is claimed is:

1. A blow molding system comprising a mold having a body with a mold cavity defined therein, means to introduce a substance into the mold cavity of the kind that can be expanded against the cavity wall by blowing air, a source of high pressure air, a vortex tube for separating the air into hot and cold fractions, means for conveying the cold fraction of air to the mold cavity for use as the blowing air, a jacket surrounding the cold air conveying means for receiving blowing air discharged from the mold cavity, and an outlet from the jacket.

2. A blow molding system comprising a mold cavity, means to introduce a parison into the mold cavity for expansion against the cavity walls upon the introduction into the cavity of blowing air, a vortex tube for receiving supply air and separating the supply air into hot and cold fractions, means for carrying the cold air fraction from the vortex tube to the mold cavity for use as the blowing air, and means for conveying some of the cold air fraction to the area outside the mold where flash occurs for cooling the flash.

3. The combination of claim 2 including valve means for regulating the amount of air conveyed to the flash area.

4. A blow molding system comprising a mold having a body with a mold cavity defined therein, means to introduce a parison into the mold cavity for expansion against the cavity walls upon the introduction to the cavity of blowing air, a vortex tube for receiving supply air and separating the supply air into hot and cold fractions, means to deliver the cold fraction of air to the mold cavity for use as the blowing air to simultaneously expand and cool the parison, air passage means through the mold body, and means to deliver some of the cold air fraction to the air passage means for additional cooling of the expanded parison.

5. A blow molding system comprising a mold having a body with a mold cavity defined therein, means to introduce a parison into the mold cavity for expansion against the cavity walls upon the introduction into the cavity of blowing air, a source of high pressure air, a vortex tube having an inlet, a cold air fraction outlet and a warm air fraction outlet, conduit means to convey air from the air source to the vortex tube inlet, and conduit means for conveying air from the cold air fraction outlet to the interior of the parison for use of the cold air as the blowing air to expand the parison against the cavity walls and as the cooling air to cool the expanded parison from the inside thereof, the cold air from the vortex tube constituting the major source of cooling medium for the expanded parison, whereby the mold body can be held above the temperature which would produce condensation on the cavity walls.

References Cited by the Examiner

UNITED STATES PATENTS

| | | | |
|---|---|---|---|
| 2,495,253 | 1/1950 | Hayes | 65—267 |
| 2,980,955 | 4/1961 | Sanko | 18—5 |
| 3,057,166 | 10/1962 | Thompson | 65—2 |
| 3,065,501 | 11/1962 | Gasmire | 264—98 |

WILLIAM J. WYE, *Primary Examiner.*